United States Patent Office 2,730,012
Patented Jan. 10, 1956

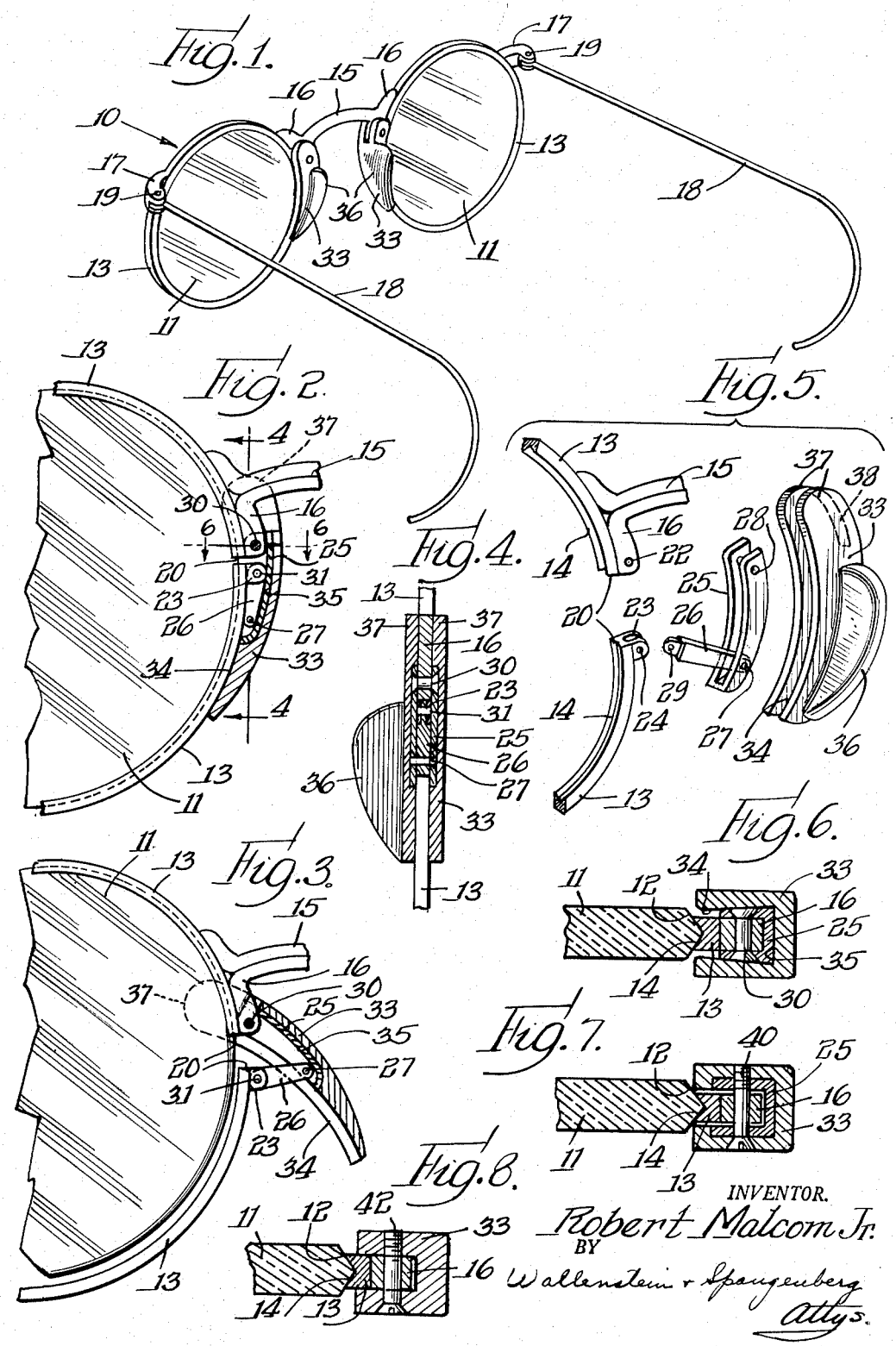

2,730,012

SPECTACLES

Robert Malcom, Jr., Chicago, Ill., assignor to Chicago Eye Shield Company, Chicago, Ill., a corporation of Illinois Application August 8, 1952, Serial No. 303,235

4 Claims. (Cl. 88—47)

This invention relates to spectacles.

The principal object of this invention is to provide improved spectacles wherein the lenses thereof may be quickly and simply replaced, wherein the eyewires for the lenses are spread and drawn together for this purpose by toggle levers adjacent the bridge bar, wherein the bridge pads for supporting the spectacles are on the toggle levers, also to aid in manipulating the toggle levers, and wherein the bridge pads also operate effectively to seal off the spaces adjacent the bridge bar when the spectacles are in place for increased eye protection.

Briefly, the spectacles of this invention include a pair of lenses, a pair of eyewires marginally receiving the pair of lenses, and a bridge bar carried by and connecting the eyewires. Suitable temples may be carried by the eyewires. The eyewires are split adjacent the bridge bar. Toggle levers are carried by each eyewire and span the split therein for spreading the eyewires to remove the lenses and for drawing together the eyewires to clamp and secure the lenses therein. Bridge pads are located on the toggle levers for supporting the spectacles and for manipulating the toggle levers for lens replacement purposes. The bridge pads may be integral with the toggle levers or separate therefrom and readily replaceable. The bridge pads may extend adjacent the bridge bar to seal off the space adjacent the bridge bar when the spectacles are in place.

Further objects of this invention reside in the details of construction of the spectacles and in the cooperative relationships between the component parts thereof.

Other objects and advantages of this invention will become apparent to those skilled in the art upon reference to the accompanying specification, claims and drawings, in which:

Fig. 1 is a perspective view of the spectacles of this invention;

Fig. 2 is an enlarged vertical sectional view through one of the bridge pads and showing the toggle levers in closed position;

Fig. 3 is a vertical sectional view similar to Fig. 2 but showing the toggle levers in open position;

Fig. 4 is a vertical sectional view taken substantially along the line 4—4 of Fig. 2;

Fig. 5 is an exploded perspective view illustrating the parts shown in Figs. 2 to 4;

Fig. 6 is a horizontal sectional view taken substantially along the line 6—6 of Fig. 2;

Figs. 7 and 8 are horizontal sectional views similar to Fig. 6 but showing different forms of the invention.

The spectacles of this invention are generally designated at 10. They include a pair of lenses 11 having beveled edges 12. A pair of eyewires 13 having V-shaped grooves 14 marginally receive the beveled edges 12 of the lenses 11 for supporting the same. A bridge bar 15 carries and connects the eyewires 13. In this connection the bridge bar 15 is provided at its ends with enlargements 16 which may be suitably welded to the eyewires 13. Temple members 17 may also be suitably secured to the eyewires 13 as by welding for carrying temples 18 pivotally secured thereto by screws 19. The eyewires 13 are split adjacent the bridge bar 15 as indicated at 20.

Each enlarged portion 16 of the bridge bar 15 is provided with a hole 22 adjacent the split 20. A bifurcated bracket 23 is suitably secured as by welding to each eyewire 13 adjacent the split 20. The brackets 23 are each provided with pivot holes 24. Toggle levers 25 and 26 are pivoted together by a pivot pin 27. Preferably the toggle lever 25 is channel shaped in cross section to receive toggle lever 26 when the toggle levers are closed, as indicated in Fig. 2. The toggle lever 25 is provided with a pivot hole 28 and the toggle lever 26 is provided with a pivot hole 29. The toggle lever 25 is pivoted to the enlargement 16 by a pivot pin 30 extending through the pivot holes 22 and 28 and the toggle lever 26 is pivoted to the bracket 23 by a pivot pin 31 extending through the pivot holes 24 and 29.

When the toggle levers 25 and 26 are open, as illustrated in Fig. 3, the eyewire 13 is spread to allow the lens 11 to be placed therein. When the toggle levers 25 and 26 are closed, as illustrated in Fig. 2, the lens 11 is securely clamped in the eyewire 13, the eyewire being drawn together for this purpose upon closing of the toggle levers. In this way, by manipulating the toggle levers 25 and 26 which span the split 20 in the eyewire, the eyewire may be spread in order to remove the lens and may be drawn together to clamp and secure the lens in place therein. Accordingly, no tools are required for lens replacement purposes, this all being accomplished by manipulation of the toggle levers.

The toggle levers carry bridge pads indicated at 33. Each bridge pad 33 has a groove 34 for receiving the eyewire 13. The bridge pad 33 is also provided with a recess or pocket 35 for receiving the toggle lever 25. In this respect, the outer faces of the toggle lever 25 are tapered and the recess or pocket 35 of the bridge pad 33 is tapered so that the bridge pad 33 may be snapped into place on the toggle lever 25. In this way the bridge pads 33 which are preferably made of a synthetic plastic, may be snapped onto and off of the toggle levers 25 and thus be removably carried thereby. Thus the bridge pads 33 may be removed when for example it is desired to sterilize the spectacles by autoclaving or the like. The bridge pads being secured to the toggle levers 25 further provide a convenient means for manipulating the toggle levers for lens replacement purposes. The bridge pads 33 are provided with pad portions 36 for resting upon the nose of the wearer when the spectacles are in place, the pad portions being relatively large for comfort during wear. The bridge pads 33 extend upwardly as indicated at 37 adjacent the bridge bar 15 to seal off the spaces adjacent the bridge bar when the spectacles are in place. This gives added protection to the eyes of the wearer. The extensions 37 of the bridge pads are provided with slots 38 to accommodate the enlargements 16 of the bridge bar 15 when the toggles are open, as indicated in Fig. 3.

In the form of the invention illustrated in Fig. 7, the bridge pads 33 are permanently secured to the toggle levers 25. In this connection, the synthetic plastic bridge pads 33 are preferably molded onto the toggle levers 25. In this unitary construction the toggle lever 25 is pivoted to the enlargement 16 of the bridge bar 15 by means of a screw 40 which extends through the nose pad 33, the toggle lever 25 and the enlargement 16.

In the form of the invention illustrated in Fig. 8, the nose pad 33 takes over the function of the toggle lever 25, the toggle lever being integrally incorporated in the bridge pad. Here the bridge pad 33 is pivoted to the enlargement 16 by a screw 42. This construction may not be quite as strong as that illustrated in Fig. 7 when the bridge pad 33 is made of a synthetic plastic, for here the stresses of the toggle lever are carried by the synthetic plastic nose pad 33.

While for purposes of illustration several forms of this invention have been disclosed, other forms thereof may become apparent to those skilled in the art upon reference to this disclosure, and therefore this invention is to be limited only by the scope of the appended claims.

I claim as my invention:

1. Spectacles comprising a pair of lenses, a pair of eye wires marginally receiving the pair of lenses, a bridge bar connecting together the pair of eye wires and having an enlargement adjacent each wire, said eye wires being split adjacent the enlargements of the bridge bar, a bracket on each eye wire adjacent to the split therein and on the opposite side of the split from the bridge bar enlargement, pivoted toggle levers for each eye wire and spanning the split therein and pivoted to the bridge bar enlargement and the bracket for spreading the eye wires to remove the lenses therefrom when the pivoted toggle levers are opened and for drawing together the eye wires to clamp and secure the lenses therein when the pivoted toggle levers are closed, each of said pivoted toggle levers including a first lever having a bifurcated portion receiving the bridge bar enlargement and being pivoted at one end thereto for movement between the open and closed positions without interference with the bracket and the bridge bar and its enlargement, a second lever pivoted at one end to the bracket and at its other end to the other end of the first lever for movement between the open and closed positions without interference with the bracket and the bridge bar and its enlargement, one of said levers being hollow and receiving the other lever when the pivoted toggle levers are in closed position with the pivot between the levers in substantial alignment with the pivots between the levers and the bracket and bridge bar enlargement, and a bridge pad on said hollow levers for supporting the spectacles and for manipulating the pivoted toggle levers between their open and closed positions.

2. Spectacles comprising a pair of lenses, a pair of eye wires marginally receiving the pair of lenses, a bridge bar connecting together the pair of eye wires and having an enlargement adjacent each wire, said eye wires being split adjacent the enlargements of the bridge bar, a bracket on each eye wire adjacent to the split therein and on the opposite side of the split from the bridge bar enlargement, pivoted toggle levers for each eye wire and spanning the split therein and pivoted to the bridge bar enlargement and the bracket for spreading the eye wires to remove the lenses therefrom when the pivoted toggle levers are opened and for drawing together the eye wires to clamp and secure the lenses therein when the pivoted toggle levers are closed, each of said pivoted toggle levers including a first lever having a bifurcated portion receiving the bridge bar enlargement and being pivoted at one end thereto for movement between the open and closed positions without interference with the bracket and the bridge bar and its enlargement, a second lever pivoted at one end to the bracket and it its other end to the other end of the first lever for movement between the open and closed positions without interference with the bracket and the bridge bar and its enlargement, said first lever being hollow and receiving the second lever when the pivoted toggle levers are in closed position with the pivot between the levers in substantial alignment with the pivots between the levers and the bracket and bridge bar enlargement, and a bridge pad on said first lever for supporting the spectacles and for manipulating the pivoted toggle levers between their open and closed positions.

3. Spectacles comprising a pair of lenses, a pair of eye wires marginally receiving the pair of lenses, a bridge bar connecting together the pair of eye wires and having an enlargement adjacent each wire, said eye wires being split adjacent the enlargements of the bridge bar, a bracket on each eye wire adjacent to the split therein and on the opposite side of the split from the bridge bar enlargement, pivoted toggle levers for each eye wire and spanning the split therein and pivoted to the bridge bar enlargement and the bracket for spreading the eye wires to remove the lenses therefrom when the pivoted toggle levers are opened and for drawing together the eye wires to clamp and secure the lenses therein when the pivoted toggle levers are closed, each of said pivoted toggle levers including a first lever having a bifurcated portion receiving the bridge bar enlargement and being pivoted at one end thereto for movement between the open and closed positions without interference with the bracket and the bridge bar and its enlargement, a second lever pivoted at one end to the bracket and at its other end to the other end of the first lever for movement between the open and closed positions without interference with the bracket and the bridge bar and its enlargement, one of said levers being hollow and receiving the other lever when the pivoted toggle levers are in closed position with the pivot between the levers in substantial alignment with the pivots between the levers and the bracket and bridge bar enlargement, and a bridge pad on said hollow lever for supporting the spectacles and for manipulating the pivoted toggle levers between their open and closed positions, said bridge pads encompassing and extending along said hollow levers and having extensions extending alongside of the bridge bar and its enlargements to seal off the spaces adjacent the bridge bar when the pivoted toggle levers are closed and being free from the bridge bar and its enlargements so as not to interfere with the movement of the pivoted toggle levers between their open and closed positions.

4. Spectacles comprising a pair of lenses, a pair of eye wires marginally receiving the pair of lenses, a bridge bar connecting together the pair of eye wires and having an enlargement adjacent each wire, said eye wires being split adjacent the enlargements of the bridge bar, a bracket on each eye wire adjacent to the split therein and on the opposite side of the split from the bridge bar enlargement, pivoted toggle levers for each eye wire and spanning the split therein and pivoted to the bridge bar enlargement and the bracket for spreading the eye wires to remove the lenses therefrom when the pivoted toggle levers are opened and for drawing together the eye wires to clamp and secure the lenses therein when the pivoted toggle levers are closed, each of said pivoted toggle levers including a first lever having a bifurcated portion receiving the bridge bar enlargement and being pivoted at one end thereto for movement between the open and closed positions without interference with the bracket and the bridge bar and its enlargement, a second lever pivoted at one end to the bracket and at its other end to the other end of the first lever for movement between the open and closed positions without interference with the bracket and the bridge bar and its enlargement, said first lever being hollow and receiving the second lever when the pivoted toggle levers are in closed position with the pivot between the levers in substantial alignment with the pivots between the levers and the bracket and bridge bar enlargement, and a bridge pad on said first lever for supporting the spectacles and for manipulating the pivoted toggle levers between their open and closed positions, said bridge pads encompassing and extending along said first levers and having extensions extending alongside of the bridge bar and its enlargements to seal off the spaces adjacent the bridge bar when the pivoted toggle levers are closed and being free from the bridge bar and its enlargements so as not to interfere with the movement of the pivoted toggle levers between their open and closed positions.

(References on following page)

References Cited in the file of this patent

UNITED STATES PATENTS

| | | |
|---|---|---|
| 373,349 | Farley | Nov. 15, 1887 |
| 2,350,338 | Casavant | June 6, 1944 |
| 2,463,041 | Malcom | Mar. 1, 1949 |
| 2,479,754 | Marks | Aug. 23, 1949 |

FOREIGN PATENTS

| | | |
|---|---|---|
| 89,954 | Germany | Jan. 4, 1897 |
| 360,617 | France | Mar. 2, 1906 |
| 883,191 | France | Mar. 22, 1943 |